United States Patent [19]

Huebner et al.

[11] Patent Number: 4,584,341
[45] Date of Patent: Apr. 22, 1986

[54] EMULSIONS OF CROSSLINKED POLYDIORGANOSILOXANES

[75] Inventors: David J. Huebner; John C. Saam, both of Midland, Mich.

[73] Assignee: Dow Corning Corporation, Midland, Mich.

[21] Appl. No.: 624,547

[22] Filed: Jun. 25, 1984

[51] Int. Cl.$^4$ .................. C08L 83/00; C08L 83/06; C08K 3/34; C08F 2/32
[52] U.S. Cl. .................. 524/837; 523/312; 523/334; 524/156; 524/158; 524/501; 524/588; 524/745; 524/747; 524/807; 525/100; 525/102; 525/106
[58] Field of Search .............. 524/501, 588, 801, 837, 524/156, 158, 745, 747; 523/334, 312; 525/102, 100, 106

[56] References Cited

U.S. PATENT DOCUMENTS

| | | | |
|---|---|---|---|
| 3,294,725 | 12/1966 | Findlay et al. | 524/745 |
| 3,360,491 | 12/1967 | Axon | 260/29.2 |
| 3,697,469 | 10/1972 | Ikoma | 260/29.2 M |
| 3,706,695 | 12/1972 | Huebner et al. | 524/745 |
| 4,066,594 | 1/1978 | Moeller | 524/724 |
| 4,248,751 | 2/1981 | Willing | 524/588 |
| 4,273,634 | 6/1981 | Saam et al. | 524/588 |
| 4,273,813 | 6/1981 | Meddaugh | 427/387 |
| 4,288,356 | 9/1981 | Huebner et al. | 524/501 |
| 4,431,982 | 2/1984 | Monroe et al. | 524/860 |

Primary Examiner—Herbert J. Lilling
Attorney, Agent, or Firm—Edward C. Elliott

[57] ABSTRACT

This invention is a method of producing a latex of crosslinked polydiorganosiloxane. The latex yields an elastomer upon removal of the water. The latex is prepared by homogenizing a mixture of hydroxyl endblocked polydiorganosiloxane, less than 75 millimoles of surface active anionic catalyst per kilogram of polydiorganosiloxane where said surface active anionic catalyst is dodecylbenzene sulfonic acid or hydrogen lauryl sulfate, and water to yield an oil-in-water emulsion. This emulsion is then admixed with from 0.5 to 15 parts by weight of an alkoxy silicon compound selected from a silane of the formula $R_a'Si(OR^3)_{4-a}$ where R' is a monovalent hydrocarbon radical of up to 12 carbon atoms, $R^3$ is an alkyl radical of 1 to 6 carbon atoms, and a is 0 or 1, a partial hydrolyzate of the silane, or mixtures of silane and partial hydrolyzate. The resulting emulsion is maintained at a temperature of about 15° to 30° C. for at least 5 hours at a pH of less than 5 until a crosslinked polymer is formed, then the emulsion is admixed with sufficient base to raise the pH to greater than 7. The crosslinked polymer present in the latex is reinforced by adding greater than 1 part by weight of colloidal silica sol or silsesquioxane to the latex. Removal of water from the latex results in a reinforced elastomer. This method yields a latex which can be applied and dried immediately after preparation to yield an elastomer.

8 Claims, No Drawings

EMULSIONS OF CROSSLINKED POLYDIORGANOSILOXANES

BACKGROUND OF THE INVENTION

1. Field of the Invention

This invention relates to a method of making aqueous emulsions of crosslinked polydiorganosilozanes which yield reinforced elastomers.

2. Background Information

A method of polymerizing siloxanes and silcarbanes in emulsion by using a surface active sulfonic acid catalyst is disclosed by Findlay and Weyenberg in U.S. Pat. No. 3,294,725, issued Dec. 27, 1966. Their method, which comprises polymerizing and copolymerizing at least one member selected from organosiloxanes of the unit formula $R_nSiO_{4-n/2}$ and silcarbanes having the general formula $HO(R)_2SiQSi(R)_2OH$ in an aqueous medium while in the dispersed state, in the presence of a compound of the formula $R'C_6H_4SO_3H$ as the primary catalyst for the polymerization until the desired increase in molecular aggregation is obtained. These emulsions are stated to be characterized by extreme stability and extremely fine particle size. The products produced were higher molecular weight fluids or solids. In the particular embodiment in which the starting siloxane has a formula

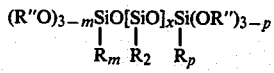

it is stated that the product, after neutralization, is a polysiloxane which does not appear gelled but when removed from the emulsion, does gel to a crosslinked rubber. Fillers can be added to the emulsion so that the strength of the rubber resulting from coagulation of the emulsion is further improved.

Axon discloses a method of polymerizing siloxanes and silcarbanes in emulsion employing organic sulfates of the general formula $R'OSO_2OH$ in U.S. Pat. No. 3,360,491, issued December 26, 1967. His method comprises polymerizing and copolymerizing at least one member of the group consisting of organosiloxanes of the unit formula $R_nSiO_{4-n/2}$ and silcarbanes having the general formula $HO(R)_2SiQSi(R)_2OH$ by polymerizing in an aqueous medium while in a dispersed state in the presence of a compound of the formula $R'OSO_2OH$ until the desired increase in molecular aggregation is obtained. The emulsions are stated as being suitable for release agents and for coating compositions. His embodiment prepared from an alkylalkoxysiloxy endblocked diorganosiloxane is stated as polymerizing to a polysiloxane which does not appear to be gelled, but which when removed from the emulsion, does gel to a crosslinked rubber. Fillers can be added to the emulsion to improve the strength of the rubber resulting from the coagulation of the emulsion. The reinforced emulsion system provides an excellent method of obtaining coatings of tough rubbery siloxane films for release coatings.

A method for emulsion polymerization of organosiloxanes is disclosed by Ikoma in U.S. Pat. No. 3,697,469, issued Oct. 10, 1972. His method emulsifies, in water containing a salt-type anionic surface active agent, an organosiloxane having the unit formula $R_aSiO_{4-a/2}$ and then contacting said emulsion with an acid type cationic exchange resin. The ion exchange converts the salt-type surface active agent to an acid-type thereby starting polymerization of the organosiloxane by making the emulsion an acid medium with a pH value of less than 4. The method is shown to polymerize organocyclosiloxanes, polysiloxane fluids, mixtures of organocyclosiloxanes and alkylalkoxysilanes, mixtures of organocyclosiloxanes and polysiloxane fluids, and alkylalkoxysilanes to give emulsions of polysiloxanes of increased viscosity. The emulsions are useful as coatings to give release properties, lubricants for textiles, and water repellent for textiles. An example combining an organocyclosiloxane and alkyltrialkoxysilane and polymerizing, then mixing the polymerized emulsion with a 10 percent sol of fine silica particles and dibutyltindioctoate emulsion gave a sheet upon drying which was a rubber.

A method of preparing an electrically conductive silicone emulsion is disclosed by Huebner and Meddaugh in U.S. Pat. No. 3,706,695, issued Dec. 19, 1972. The method dissolves a surface active sulfonic acid in water, mixes in a siloxane fluid and homogenizes the mixture to provide a stable dispersion. The dispersion is heated for at least one hour to polymerize the siloxanes, then adds a nonionic emulsifying agent and neutralizes the acid to give a pH of 6.5 to 9. Finely divided carbon black, a metallic salt of a carboxylic acid and a silane of the formula $RSi(OR')_3$ are then mixed into the emulsion. When the emulsion is applied to a substrate and dried, a heat stable electrically conductive silicone rubber is formed. Satisfactory cure is obtained for a period of about two weeks after mixing. The curability can be restored by adding additional catalyst, alkoxysilane or both.

SUMMARY OF THE INVENTION

This invention relates to a method of producing an aqueous latex of crosslinked polydiorganosiloxane. The aqueous latex is prepared by homogenizing a mixture of hydroxyl endblocked polydiorganosiloxane (1), less than 75 millimoles of surface active anionic catalyst per kilogram of polyorganosiloxane where said surface active anionic catalyst is selected from the group consisting of dodecylbenzenesulfonic acid and hydrogen lauryl sulfate, and water to yield an oil-in-water emulsion. This emulsion is then admixed with from 0.5 to 15 parts by weight of an alkoxy silicon compound selected from the group consisting of a silane of the formula $R_a'Si(OR^3)_{4-a}$ where $R'$ is a monovalent hydrocarbon radical having up to 12 carbon atoms, $R^3$ is an alkyl radical having from 1 to 6 inclusive carbon atoms, and $a$ is 0 or 1; a partial hydrolyzate of the silane where the partial hydrolyzate is soluble in the polydiorganosiloxane (1); and mixtures of silane and partial hydrolyzate. The emulsion is maintained at a temperature of from 15° to 30° C. for at least 5 hours at a pH of less than 5 until a crosslinked polymer emulsion is formed, then the emulsion is admixed with sufficient base to raise the pH to greater than 7. The crosslinked polymer present in the emulsion is reinforced by adding greater than 1 part by weight of colloidal silica sol or silsesquioxane to yield a latex. Removal of water from the latex results in a reinforced elastomer.

The method of this invention yields a latex which can be utilized immediately after manufacture to yield crosslinked silicone elastomers. The latex yields an elastomer upon removal of the water, no further curing is required. The method yields a latex which can be stored for a period of months without significant change in its properties.

DESCRIPTION OF THE INVENTION

This invention relates to a method of producing an aqueous latex of crosslinked polydiorganosiloxane consisting essentially of (A) homogenizing a mixture consisting essentially of (1) 100 parts by weight of polydiorganosiloxane of the formula $$HO(R_2SiO)_xH$$

wherein each R is a radical selected from the group consisting of methyl, ethyl, propyl, phenyl, vinyl, allyl, and 3,3,3-trifluoropropyl, and x is an average value in the range of from 3 to 100 inclusive (2) from 15 to 75 millimoles of surface active anionic catalyst per kilogram of polydiorganosiloxane where said catalyst is selected from the group consisting of dodecylbenzene sulfonic acid and hydrogen lauryl sulfate, and (3) water, to yield an oil-in water emulsion, then (B) admixing from 0.5 to 15 parts by weight of an alkoxy silicon compound selected from the group consisting of silane of the formula $R_a'Si(OR^3)_{4-a}$ where R' is a monovalent hydrocarbon radical having up to 12 carbon atoms, $R^3$ is an alkyl radical having 1 to 6 inclusive carbon atoms, and a is 0 or 1; a partial hydrolyzate of the silane where the partial hydrolyzate is soluble in the polydiorganosiloxane (1); and mixtures of silane and partial hydrolyzate, (C) maintaining the emulsion produced in (B) at a temperature of from 15 to 30° C. for at least 5 hours at a pH of less than 5 until a crosslinked polymer emulsion is formed, then (D) admixing sufficient base to raise the pH of the product of (C) to greater than 7, then (E) admixing greater than 1 part by weight of colloidal silica sol or colloidal silsesquioxane to yield a latex which produces an elastomer upon removal of the water at room temperature.

The method of this invention homogenizes the hydroxyl endblocked polydiorganosiloxane fluid using a critical amount of surface active anionic catalyst, then adds an alkoxy silicon compound to the emulsion as a source of multifunctional units which serve to react with the hydroxyl endblocked polydiorganosiloxane fluid in the emulsion droplets to produce crosslinked polymer. It has been found that the polymer formed in the emulsion will not crosslink or will crosslink only at a very slow rate if the amount of surface active anionic catalyst is increased to levels above those specified. It is believed that the amount of catalyst present in the emulsion must be less than that necessary to form a monomolecular layer of catalyst over the surface of the polydiorganosiloxane droplets present in the emulsion. The critical upper limit of catalyst therefore depends upon the size of the droplets present in the emulsion, which is dependent upon the method used to form the emulsion.

It is believed that in the method of this invention, the admixing of the alkoxy silicon compound into the homogenized polydiorganosiloxane stabilized with a limited amount of surfactant after the homogenization allows the alkoxy silicon compound to migrate from the water phase through the surfactant layer on the polydiorganosiloxane droplet surface into the surface of the droplets. Once inside the droplet surface, the alkoxy silicon compound can react with the hydroxyl endblocked polydiorganosiloxane polymer to produce crosslinks. If an excess of surfactant is present, the alkoxy silicon compound is restricted in its ability to move from the continuous water phase into the polydiorganosiloxane droplets.

This inventive method produces an aqueous latex which contains crosslinked polydimethylsiloxane which, when combined with colloidal silica, yields useful elastomers upon evaporation of the water. Without the silica present, the emulsion yields a comparatively weak, continuous, crosslinked film. As used herein, an elastomer comprises the crosslinked polymer particles and the reinforcing colloidal silica or silsesquioxane as a material that has a useful tensile strength, stretches under tension, and retracts rapidly to recover its original dimensions.

The latices of this invention do not contain a metallic catalyst because the crosslinked polymer is readily formed in the emulsion without such a catalyst. Because no metallic catalyst is necessary, there is no problem with a catalyst continuing to cause crosslinking during storage and causing a change of physical properties of the elastomer after varying storage times. Because there is no metallic catalyst, the heat stability of the resulting elastomer is expected to be superior to those products containing an active catalyst such as a tin compound. Because there is no metallic catalyst present, the elastomer produced by the method of this invention is expected to have a low toxicity.

The hydroxyl endblocked polydiorganosiloxanes (1) used in the method of this invention are well known in the art. The hydroxyl endblocked polydiorganosiloxane can be any of the polydiorganosiloxanes endblocked with hydroxyl radicals and can be represented by the formula $$HO(R_2SiO)_xH$$

where each R is selected from the group consisting of methyl, ethyl, propyl, phenyl, vinyl, alkyl, and 3,3,3-trifluoropropyl, and mixtures thereof wherein at least 50 percent of the radicals are methyl radicals. The polydiorganosiloxane can be a single type polymer with the same kind of repeating diorganosiloxane units or it can be a combination of two or more kinds of repeating diorganosiloxane units, such as combination of dimethylsiloxane units and methylphenylsiloxane units. The polydiorganosiloxane can also be a mixture of two or more kinds of polydiorganosiloxanes. The polydiorganosiloxanes are those in which x is an average value in the range of from 3 to 100 inclusive. The preferred polydiorganosiloxanes are those in which x is at least large enough that the viscosity of the polydiorganosiloxane is at least 0.05 Pa's at 25° C. (x is about 25). A preferred polydiorganosiloxane is a polydimethylsiloxane having a viscosity of from about 0.05 Pa's to 0.15 Pa's at 25° C., the value of x for such a material being from about 25 to 80.

The alkoxysilicon compound used in the method of this invention is of the formula $$R_a'Si(OR^3)_{4-a}$$

where R' is a monovalent hydrocarbon radical having up to 12 carbon atoms, $R^3$ is an alkyl radical having from 1 to 6 inclusive carbon atoms, and a is 0 or 1; a partial hydrolyzate of the silane where the partial hydrolyzate is soluble is the polydiorganosiloxane (1); and mixtures of silane and partial hydrolyzate. These alkoxy silicon compounds are well known in the art and many are commercially available. R' can be illustrated by radicals such as methyl, ethyl, propyl, isopropyl, butyl, hexyl, dodecyl, vinyl, allyl, phenyl, tolyl, and 3,3,3-trifluoropropyl. $R^3$ is an alkyl radical such as methyl, ethyl, propyl, and hexyl. Preferably both R' and $R^3$ are methyl. Preferred silanes include methyltrimethoxysilane, and ethylorthosilicate with ethylorthosilicate most preferred. A preferred partial hydrolyzate of silane is ethylpolysilicate.

The amount of alkoxy silicon compound present can vary from 0.5 to 15 parts by weight based upon 100 parts by weight of the hydroxyl endblocked polydiorganosiloxane with a preferred amount of from 1 to 5 parts by weight. The amount of alkoxy silicon compound used has an effect upon the degree of crosslinking in the emulsion polymer. The preferred amount of alkoxy silicon compound is dependent upon the hydroxyl endblocked polydiorganosiloxane used, the alkoxy silicon compound used, the time allowed for reaction, and the type and amount of surface active anionic catalyst. The preferred amount of alkoxy silicon compound is determined by the users physical property requirements, in particular, how much elongation is desired in the elastomer produced, and what are acceptable tensile strength values. Higher amounts of alkoxy silicon compound cause more crosslinking so that the elongation at break of the elastomer is lowered.

The method of this invention uses a surface active anionic catalyst to form the emulsion and to catalyze the reaction of the hydroxyl endblocked polydiorganosiloxane and the alkoxy silicon compound. The surface active anionic catalyst is selected from the group consisting of dodecylbenzene sulfonic acid and hydrogen lauryl sulfate.

The surface active anionic catalyst as used in this invention performs a dual function. The catalyst must function as a surfactant so that the hydroxyl endblocked polydiorganosiloxane is properly emulsified to form the oil-in-water emulsion. In such an emulsion, the surfactant forms a layer over the surface of the polydiorganosiloxane particles and keeps them from coalescing. The surfactant on the surface of the particles also acts as a catalyst in the reaction between the hydroxyl endblocked polydiorganosiloxane and the alkoxy silicon compound to crosslink the polydiorganosiloxane in the particles.

The dodecylbenzene sulfonic acid is available commercially. Hydrogen lauryl sulfate may be obtained by dissolving sodium lauryl sulfate in water, then adding hydrogen chloride to form the hydrogen lauryl sulfate and sodium chloride. Another method treats the sodium lauryl sulfate solution with a cation exchange resin which exchanges sodium ion for hydrogen ion. The solution of hydrogen lauryl sulfate is then used as the catalyst in the method of this invention. The hydrogen lauryl sulfate can also be produced in situ by homogenizing the polydiorganosiloxane, and water with sodium lauryl sulfate, then adding hydrogen chloride to the emulsion formed by the homogenization to convert the sodium lauryl sulfate to hydrogen lauryl sulfate catalyst. This in situ method of producing hydrogen lauryl sulfate is considered to fall within the scope of the claims.

The emulsion of crosslinked polydiorganosiloxane of this invention is reinforced by adding greater than 1 part by weight of colloidal silica sol or silsequioxane per 100 parts by weight of hydroxyl endblocked polydiorganosiloxane to the emulsion. Without reinforcement, the elastomer film formed from the emulsion is weak. The colloidal silica sols are commercially available dispersions of colloidal silica in water. They are available at concentrations of colloidal silica varying from 15 percent to 50 percent by weight, with average particle sizes varying from about 4 to 60 nanometers. The colloidal silica sols are available with pH of from about 8.5 to about 10.5 and about 3.2. As the amount of colloidal silica used to reinforce the emulsion is increased, the initial modulus of elasticity remains nearly constant for amounts above 10 parts by weight colloidal silica per 100 parts by weight of polydiorganosiloxane.

The range of physical properties, such as tensile strength and elongation at break obtainable is about the same for the different colloidal silica sols. The amount of colloidal silica sol required for a given property depends upon which one is chosen. For example, a colloidal silica sol having an average particle diameter of about 4 nanometers gave a combination of tensile strength and elongation considered optimum at about 11 parts by weight silica per 100 parts by weight of polydiorganosiloxane, while a colloidal silica sol having an average particle diameter of about 15 nanometers gave optimum properties at about 30 parts by weight.

The preferred colloidal silica sols have particle sizes of from about 4 nanometers to 60 nanometers. The preferred amounts of colloidal silica sol are from 10 to 50 parts by weight per 100 parts of polydiorganosiloxane.

The emulsion can also be reinforced with silsesquioxane, for instance a methylsilsesquioxane having the unit formula $CH_3SiO_{3/2}$ which is prepared in an emulsion. The process of making these silsesquioxanes, having colloidal sized particles, of the formula $R''SiO_{3/2}$, is found in U.S. Pat. No. 3,433,780 issued Mar. 18, 1969 to Joseph Cekada, Jr. and Donald R. Weyenberg. Briefly, these silsequioxanes are prepared by adding a silane, having the formula $R''Si(OR''')_3$, wherein $R''$ is a hydrocarbon or a substituted hydrocarbon radical containing from 1 to 7 carbon atoms, $R'''$ is a group containing 1 to 4 carbon atoms (i.e. methyl, ethyl, isopropyl, or butyl) or

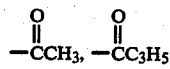

$-CH_2CH_2OH$, $-CH_2CH_2OCH_3$, or $-CH_2C-H_2OC_2H_5$, to a water-surfactant mixture with agitation under acidic or basic conditions. The surfactant can be either anionic or cationic in nature as defined in the foregoing application. The amount of silane employed in the production of silsesquioxanes should be less than about 10% by weight based on the combined weights of the silane, water and surfactant although up to about 35% by weight of silane can be employed if it is added to the water-surfactant mixture at the rate of less than one mol of silane per hour.

The silsequioxanes can be employed in the form of the colloidal suspensions, as they are prepared, in this invention. Copolymers and blends of the silsesquioxanes can be employed in the emulsion as well as the individual ones and the formula $R''SiO_{3/2}$ is intended to include such materials.

The method of this invention homogenizes a mixture consisting essentially of polydiorganosiloxane (1), from 15 to 75 millimoles of surface active anionic catalyst (2), and water to yield an oil-in-water emulsion, that is, an emulsion of particles of polydiorganosiloxane dispersed in water. This emulsion can be prepared in any of the well known manners of making emulsions such as in a high shear mixer or homogenizer. The emulsion formed is stable upon standing, that is, it does not cream or precipitate. The emulsion particle size is dependent upon the method of emulsification used. Typically particles have an average diameter of about 225 nanometers.

After the mixture is homogenized to form the emulsion, from 0.5 to 15 parts by weight of alkoxy silicon compound is mixed into the emulsion to provide a multifunctional unit which reacts with the hydroxyl endblocked polydiorganosiloxane to crosslink the polymer. The preferred amount of alkoxy silicon compound is dependent upon the particular alkoxy silicon compound used and upon the amount of crosslinking desired in the emulsion particles. A higher amount of alkoxy silicon compound gives more crosslinking.

After addition of the alkoxy silicon compound, the emulsion is maintained at a temperature of from 15° to 30° C., preferably at room temperature. The emulsion is maintained at temperature until the preferred amount of crosslinking is achieved in the polymer. This period of time is at least 5 hours; typically from 12 to 100 hours, with a preferred time of least 72 hours. The reaction is believed to comprise a chain extension initially, then a combination of polymerization and crosslinking to yield particles of higher molecular weight crosslinked polymer. The pH of the emulsion is maintained at a value less than 5. The desired degree of crosslinking may be determined by experiment, as follows. A series of samples are taken from the emulsion while it is reacting. The reaction is halted by admixing base to raise the pH to greater than 7, typically about 10. Each sample is then mixed with an amount of colloidal silica sol, a film of the latex is layed down, and the film dried. The physical properties of the elastomer produced by drying the film are measured. A plot of the measured physical properties versus the time of reaction is prepared and used to determine the reaction time necessary to provide the physical properties preferred by the experimenter.

After the polymerization has progressed as far as desired, the reaction is halted by admixing sufficient base into the emulsion to raise the pH to greater than 7. A preferred method uses a dilute aqueous solution of sodium hydroxide or ammonium hydroxide. The preferred pH for the emulsion is greater than 8 with the most preferred pH from 9 to 11.

The emulsion is reinforced by adding greater than 1 part by weight of colloidal silica sol or silsesquioxane to the emulsion to yield a latex. These reinforcing agents have been discussed above. An elastomer can be formed from the latex by removal of the water from the latex. The latex preferably has a solids content of greater than 20 percent by weight. Solids content is defined as the percent by weight of the emulsion remaining after exposure of the emulsion to the atmosphere, to remove the water, for a period of time sufficient to approach equilibrium; 7 days at 50 percent relative humidity and 70° F. is typical. Emulsions with a solids content of less than 40 percent tend to crack upon drying a cast film as in preparing an elastomeric film. Preferred for casting films or coatings of greater than 1 mm wet thickness, for example, are solids contents of 40 to 60 percent. Solids contents below 40 percent can be used for coating or impregnating as in treating paper or fabric. The water can be removed by evaporation at room temperature or by heating. The latex provides an elastomer with useful properties immediately upon removal of the water. The physical properties of the cured elastomer have been found to change to some degree upon aging after drying of the elastomer.

Additional ingredients may be added to the aqueous emulsions of this invention to alter the properties of the elastomer produced by drying the emulsion as long as they are evaluated to ensure that they do not effect the stability of the emulsion or its ability to cure upon removal of the water. The emulsion can be modified by the addition of surface active anionic or non-ionic surfactant after the neutralization step. Typical additives include other fillers, such as ground silica, pigments or dyes, and heat stability additives such as iron oxide.

The latex of this invention is useful in those applications where an elastomeric coating on a substrate is desired. The elastomer is formed by removing the water to yield a cured, crosslinked material without any curing step required. The coating can be used as a paper coating, for instance, or as a construction coating. The emulsion can also be cast into thick films or molded parts to form elastomeric parts. By using a higher solids content, and/or extending fillers, the emulsion can be thickened to produce an aqueous material useful as a caulking material. The emulsion may be combined with carbon black, graphite, or graphite fibers to yield cured films which are electrically conductive.

The following examples are presented for purposes of illustrating the invention and should not be construed as limiting the scope of the invention which is properly delineated in the claims. All parts are parts by weight.

EXAMPLE 1

An aqueous emulsion of crosslinked polydiorganosiloxane was produced by homogenizing the hydroxyl endblocked polydiorganosiloxane, surface active anionic catalyst, and water, then adding the alkoxy silicon compound. When this procedure is used, the amount of surface active anionic catalyst becomes critical.

A mixture of 100 parts by weight of hydroxyl endblocked polydimethylsiloxane fluid having a viscosity of about 0.09 Pa's at 25° C. and 100 parts by weight of water were mixed with 2 parts by weight of dodecylbenzene sulfonic acid and the mixture homogenized by passing through a laboratory homogenizer to form particles having an average of 0.22 micrometers diameter. Immediately after homogenization, 4 parts by weight of methyltrimethoxysilane was admixed with the emulsion. The emulsion had about 60 millimoles of surfactant present for each kilogram of polymer. After 3 days at room temperature, the polymerization was stopped by adding 9.6 g of a 3 percent solution of sodium hydroxide per 100 parts by weight of polydimethylsiloxane fluid to raise the pH to greater than 7 and 20 parts by weight colloidal silica were added in the form of a colloidal silica sol. The colloidal silica sol has a solids content of about 30 percent by weight, a pH of 10, and colloidal silica particles having an average particle size of about 8 nanometers. This is 20 parts by weight colloidal silica per 100 parts by weight of polydimethylsiloxane fluid. The latex had about 45 percent by weight solids and about 55 percent by weight water. A film was formed by pouring the reinforced emulsion into a container and allowing to dry at 21° C. The film had a tensile strength of 1.31 MPa and an elongation at break of 155 percent.

The above procedure was repeated for a comparative example using 3 parts by weight of the dodecylbenzene sulfonic acid (91 millimoles of surfactant, present for each kilogram of polymer) and 2 parts by weight of the methyltrimethoxysilane. The tensile strength of the cured film was 0.28 MPa, only 20 percent of that obtained above, and the elongation at break was 300 percent.

EXAMPLE 2

Emulsions were produced as in Example 1, using 2 different procedures, but using ethylorthosilicate as the alkoxy silicon compound.

In method A, a mixture of 100 parts by weight of the hydroxyl endblocked polydimethylsiloxane of Example 1 and 100 parts by weight of water were mixed with 2 parts by weight of dodecylbenzene sulfonic acid and the mixture was homogenized (61 millimoles of surfactant per kilogram of polydimethylsiloxane). Immediately after homogenization, 6 parts by weight of ethylorthosilicate was admixed with the emulsion. After 3 days at room temperature the polymerization was stopped by adding a sufficient amount of a 3 percent solution of sodium hydroxide to raise the pH to greater than 7 and then 20 parts by weight of colloidal silica were added in the form of the colloidal silica sol of Example 1. When a film was formed and tested as in Example 1, the result were as shown below. A comparative example was prepared by repeating the procedure, except the amount of dodecylbenzene sulfonic acid was increased to 3 parts by weight (90 millimoles of surfactant per kilogram of polydimethylsiloxane), an amount above the upper limit allowed in this invention.

Another comparative mixture was prepared by a method not falling under the method of this invention by mixing 100 parts by weight of the hydroxyl endblocked polydimethylsiloxane of Example 1 and 6 parts by weight of ethylorthosilicate with 3 parts by weight of dodecylbenzene sulfonic acid in 100 parts by weight of water. The mixture was immediately passed through a laboratory homogenizer twice at a pressure of 53.7 MPa. The resulting emulsion was allowed to react for 3 days at room temperature, then was mixed with a sufficient amount of a 3 percent solution of sodium hydroxide in water to raise the pH to greater than 7.

The basic emulsion was mixed with 20 parts of colloidal silica in the form of the sol of Example 1. A film was formed and tested as in Example 1 with the results shown below.

The test results show that the amount of dodecylbenzene sulfonic acid used in critical when the alkoxy silicon compound (crosslinking agent) is added after the homogenization step as in the method of this invention (Method A). When the crosslinking agent is added before homogenization in a method not in accordance with the method of this invention (Method B), the amount of surface active anionic catalyst used is not critical in that the physical properties, i.e. tensile strength, are not adversely effected by using amounts of catalyst greater than are found useful in the method of this invention. The preferred physical properties can be obtained by either Method A or Method B, but Method A requires that the amount of surface active anionic catalyst be within the scope of the claims in order to obtain these preferred properties.

| Method | DBSA Amount parts | mm/kg | Tensile Strength mega Pascals | Elongation percent |
|--------|------|-------|-------|------|
| A | 2 | 61 | 1.99 | 149 |
| A* | 3 | 90 | 0.55 | 325 |
| B* | 3 | 90 | 1.86 | 155 |

*Comparative Examples
Method A: Alkoxy silicon compound added in step (B) after homogenization step (A).
Method B: Alkoxy silicon compound added to mixture of polydiorganosiloxane and catalyst before homogenization.

That which is claimed:

1. A method of producing an aqueous latex of crosslinked polydiorganosiloxane consisting essentially of
(A) homogenizing a mixture consisting essentially of
  (1) 100 parts by weight of polydiorganosiloxane of the formula:

$HO(R_2SiO)_xH$ wherein each R is a radical selected from the group consisting of methyl, ethyl, propyl, phenyl, vinyl, allyl, and 3,3,3-trifluoropropyl, and x is an average value in the range of from 3 to 100 inclusive
  (2) from 15 to 75 millimoles of surface active anionic catalyst per kilogram of polydiorganosiloxane where said catalyst is selected from the group consisting of dodecylbenzene sulfonic acid and hydrogen lauryl sulfate, and
  (3) water, to yield an oil-in water emulsion, then
(B) admixing from 0.5 to 15 parts by weight of an alkoxy silicon compound selected from the group consisting of silane of the formula $R_a'Si(OR^3)_{4-a}$ where R' is a monovalent hydrocarbon radical having up to 12 carbon atoms, $R^3$ is an alkyl radical having 1 to 6 inclusive carbon atoms, and a is 0 or 1; a partial hydrolyzate of the silane where the partial hydrolyzate is soluble in the polydiorganosiloxane (1); and mixtures of silane and partial hydrolyzate,
(C) maintaining the emulsion produced in (B) at a temperature of from 15 to 30° C. for at least 5 hours at a pH of less than 5 until a crosslinked polymer emulsion is formed, then
(D) admixing sufficient base to raise the pH of the product of (C) to greater than 7, then
(E) admixing greater than 1 part by weight of colloidal silica sol or colloidal silsesquioxane to yield a latex which produces an elastomer upon removal of the water at room temperature.

2. The method of claim in which R' is selected from the group consisting of methyl, ethyl, propyl, and phenyl and $R^3$ is selected from the group consisting of methyl, ethyl, and propyl.

3. The method of claim 1 in which the alkoxy silicon compound is present in an amount of from 1 to 5 parts by weight and is chosen from the group consisting of ethylorthosilicate, ethylpolysilicate, methyltrimethoxysilane, and phenyltrimethoxysilane.

4. The method of claim 3 in which (E) is 10 to 50 parts by weight of colloidal silica.

5. The aqueous latex of crosslinked polydiorganosiloxane produced by the method of claim 1.

6. The aqueous latex of crosslinked polydiorganosiloxane produced by the method of claim 5.

7. The elastomer produced by drying the latex of claim 6.

8. The elastomer produced by drying the latex of claim 7.

* * * * *

UNITED STATES PATENT AND TRADEMARK OFFICE
CERTIFICATE OF CORRECTION

PATENT NO. : 4,584,341

DATED : April 22, 1986

INVENTOR(S) : David J. Huebner and John C. Saam

It is certified that error appears in the above-identified patent and that said Letters Patent is hereby corrected as shown below:

In Column 10, line 49, claim 2; the words "The method of claim in which" should read "The method of claim 1 in which".

In Column 4, line 50; the word "Pa's" should read "Pa.s".

In Column 4, line 53; the word "Pa's" should read "Pa.s".

In Column 4, line 53· the words "0.15 Pa's" should "0.15 Pa.s".

In Column 8, line 39 the word "Pa's" should read "Pa.s".

In Column 1, line 9; the word "polydiorganosilozanes" should read "polydiorganosiloxanes".

In Column 2, line 27; the formula "RSi(OR')3" should read "RSi(OR')3".

In Column 5, line 61; the word "silsequioxane" should read "silsesquioxane".

In Column 6, line 32; the word "silsequioxane" should read "silsesquioxane".

In Column 6, line 53; the word "silsequioxane" should read "silsesquioxane".

In Column 7, line 16; the word "preferrably" should read "preferably".

Signed and Sealed this

Third Day of February, 1987

*Attest:*

DONALD J. QUIGG

*Attesting Officer*  *Commissioner of Patents and Trademarks*